Patented July 18, 1939

2,166,579

UNITED STATES PATENT OFFICE 2,166,579

MANUFACTURE OF AMMONIUM NITRATE

Robert W. Cairns, Wilmington, Del., assignor to Hercules Powder Company, Wilmington, Del., a corporation of Delaware No Drawing. Application July 12, 1937, Serial No. 153,280

5 Claims. (Cl. 23—103)

This invention relates to a method of manufacture of ammonium nitrate, and more particularly to a method of manufacture of dense, granular ammonium nitrate.

In the manufacture of dynamites containing nitrate of ammonia, it is desirable to employ nitrate of ammonia of uniform granulation and high apparent density, on account of the rigid requirements of the trade as to rate of detonation, sensitiveness to detonation, freedom from setting to a hard mass, and density of the finished dynamite. Accurate control of all these factors is extremely difficult.

The manufacture of granular nitrate of ammonia is not new. Many methods of crystallization of nitrate of ammonia are known, but in all processes heretofore known, granular nitrate of ammonia has been prepared by evaporation of water from solutions of nitrate of ammonia until a very small proportion of water remains, followed by graining of the fused mass of nitrate of ammonia at temperatures in excess of 100° C., during which process substantially all of the remaining water is expelled and an anhydrous, or nearly anhydrous product formed. At the graining temperatures heretofore employed, the stable forms of the crystals of nitrate of ammonia are of the tetragonal (at 84–125° C.) and the cubic (at 125–169° C.). The natural habits of these crystals modifications, formed by crystallization from an aqueous, high temperature melt, are such that compact, more or less rounded grains are produced, resulting in a dry product having fairly satisfactory flowing properties and high apparent density, e. g. 0.9–1.1 g./cc. Thus, the grained nitrate of ammonia is suitable for use in explosives of high strength and high density.

When nitrate of ammonia has heretofore been crystallized from aqueous solutions thereof at temperatures below 100° C., e. g. as in U. S. Patent 1,924,912, to Champney, nitrate of ammonia of low density has been formed, suitable only for use in the manufacture of dynamites of low density. Such low density nitrate of ammonia is not the object of this invention.

I am not aware of a method heretofore disclosed for the crystallization of nitrate of ammonia of high density from aqueous solutions thereof at temperatures below 100° C.

I have found that the reason for the low density of nitrate of ammonia obtained by crystallization thereof from aqueous solutions at temperatures below 100° C. is (a) that the normal crystal habits of nitrate of ammonia crystallized from solutions thereof in the ranges of stability of the two rhombic modifications) −16 to 32.1° C. and 32.1 to 84.2° C.) are needle-like. The lengths of the needles so formed are many times their maximum width. Consequently, when thoroughly dried, such needle-like crystals pack together in a loose, brush heap-like mass having many voids; and (b) that during the drying process a certain amount of mother liquor, not removed or removable by filtration or centrifuging, is present on the crystals, and as this mother liquor evaporates, the crystals become cemented together by the material precipitated from the evaporated mother liquor. This prevents the crystals freely orienting themselves in a compact state, and is conducive to the formation of a nitrate of ammonia of low apparent density.

I have found that I can overcome the above disadvantages and produce, by crystallization of aqueous nitrate of ammonia solutions at temperatures below 100° C., dense, granular, free-flowing nitrate of ammonia.

Furthermore, I have found that an additional advantage of the use of my process is the low temperature employed therein. Heretofore, evaporation of aqueous nitrate of ammonia solutions, and fusion of the resulting mass, has required high temperatures, e. g. about 280–305° F. If any organic material, such as wax, petrolatum, grease, paper fiber, nitrotoluenes, or the like, be accidentally included in such operation, disastrous fires from the oxidation of such organic substances may, and have, occurred, and in some cases have led to disastrous explosions of the mass of fused nitrate of ammonia.

It will be understood that nitrate of ammonia undergoes a physical transition at or about 32.1° C. and changes from one needle-like modification to another if it be heated or cooled through this transition point. Such transition takes place at a finite rate of speed, usually heightened by the presence of moisture or water. Minor thermal and physical effects occur coincident with this transition, but the crystals of nitrate of ammonia, if unagitated during the transition, retain substantially the same external form and crystalline habit. However, I have found that if a mass of needle-like crystals of nitrate of ammonia be stirred constantly while heated or cooled through the transition point, fragmentation of the crystals takes place, the needle-like crystals break down, usually by transverse fissure, and compact grains of nitrate of ammonia of high apparent density are formed. If this process be carried out with nitrate of ammonia in the dry state, the degree of fragmentation of the crystals is difficult or impossible to control, and a uniform product cannot readily be produced.

In contrast to the results obtained in the application of the above process to dry nitrate of ammonia crystals, I have found that I can produce extremely uniform, dense, granular crystals of nitrate of ammonia by cooling or warming an agitated mass of previously-formed, needle-like crystals of nitrate of ammonia through the 32.1° C. transition point, while such crystals are still in contact with the mother liquor from which they have been produced.

I have found that by crystallizing an ammonium nitrate solution, starting from a temperature below 100° C., my lower limit of temperature to which I cool the mass is a function of the upper or starting limit of crystallization, i. e. the lower temperature limit is that temperature within the range of 32.1° C. and a temperature which is not more than one-half as far below 32.1° C. as the upper limit is above 32.1° C.

For example, with an upper, or starting limit of 70° C., 70—32, or 38, will be the difference between 32 and the upper limit, and one-half of 38, i. e. 19, will be the number of degrees below 32 which form the lower limit, i. e. the lower limit range will be 32° to 13° C.

As illustrative of the carrying out of the process in accordance with my invention, I dissolve 4 kg. of nitrate of ammonia in 800 g. of water by heating the mixture to about 80° C., then cool this solution, with constant stirring, for example, in a jacketed vessel containing in the jacket cooling water at about 10–20° C., the cooling rate being, for example, about 2° C. per minute. The first crystals of nitrate of ammonia form at about 70° C., and fine, needle-like crystals form constantly as the solution cools. When the temperature of the solution reaches 35 to 40° C., the mixture becomes very thick and difficult to stir. At about 32° C. a marked change takes place, the needle-like crystals breaking down, and the mixture becomes much thinner in consistency. This change in consistency at around 32° C. is an index of the completeness of the transition. When, upon inspection, the transition seems to be complete, and after further moderate cooling, if necessary, I then separate the crystals from the mother liquor, for example, by filtration or centrifuging, and dry the moist crystals by passing through them a current of dry air, for example, at 30–70° C., while the crystals are being agitated slowly and constantly. After a period of about 1–3 hours, for example, the moisture content of the crystals is about 0.2% or less, and the product is ready for use in explosives or otherwise.

As further illustrative of the carrying out of the process in accordance with my invention, I prepared 50 grams of crystallized ammonium nitrate by evaporation of a saturated solution at 30° C. This product is in the form of slender needles from a few millimeters to 2 centimeters long and less than 1 millimeter thick. This needle-like material is then added to 65 grams of a saturated ammonium nitrate solution at 30° C. and the mixture is heated to 35° C., with constant stirring, in approximately 5 minutes. After stirring for several minutes at 35° C. no needles are observed in the mixture. Whereas stirring, unaccompanied by heating, causes no appreciable change in crystal form, combined stirring and heating of the crystals and mother liquor through the transition point at 32.1° C. effects a breakdown of the needles and results in the formation of a granular compact crystal form, which, when separated by filtration and dried in the manner shown above, is satisfactory for use in explosives or otherwise.

I have found that in operating my process as in the example above, care must be taken to insure a sufficient duration of heating to allow all of the ammonium nitrate to undergo the transition to the higher temperature modification before permitting any recooling. Heating may be carried to any temperature above the transition point provided the temperature is not so high as to cause an undesirable amount of re-solution of the suspended crystals in the mother liquor. The initial temperature should be as close to the transition point as is feasible, but below it, in order to insure all of the material being in the lower temperature modification at the start. From a practical standpoint, I have found that the heating range should be between about 20° C. and about 40° C., although my invention is operable between wider limits.

What I claim and desire to protect by Letters Patent is:

1. In a process of preparation of dense granular ammonium nitrate the steps which include effecting a progressive temperature change in a suspension of needle-like ammonium nitrate crystals in a saturated aqueous ammonium nitrate mother liquor, said temperature change including a transition point temperature which is about 32.1° C., subjecting the suspension to sufficiently vigorous agitation to cause fragmentation of the needle-like crystals while the temperature of the suspension passes through said transition point, and withdrawing the said broken crystals before substantial regrowth of needle-like crystals.

2. In a process of preparation of dense granular ammonium nitrate the steps which include heating a suspension of needle-like ammonium nitrate crystals in a saturated aqueous ammonium nitrate mother liquor, said heating including a transition point temperature which is about 32.1° C., subjecting the suspension to sufficiently vigorous agitation to cause fragmentation of the needle-like crystals while the temperature of the suspension passes through said transition point, and withdrawing the said broken crystals before substantial regrowth of needle-like crystals.

3. In a process of preparation of dense granular ammonium nitrate the steps which include heating from about 20° C. to about 40° C. a suspension of needle-like ammonium nitrate crystals in a saturated aqueous ammonium nitrate mother liquor, subjecting the suspension to sufficiently vigorous agitation to cause fragmentation of the needle-like crystals while the temperature of the suspension passes through the transition point temperature of about 32.1° C., and withdrawing the said broken crystals before substantial regrowth of needle-like crystals.

4. The process of preparation of dense granular ammonium nitrate which includes cooling from a temperature substantially below 100° C. to a temperature below the transition point temperature of about 32.1° C., a suspension of needle-like ammonium nitrate crystals in a saturated aqueous ammonium nitrate mother liquor, subjecting the suspension to sufficiently vigorous agitation to cause fragmentation of the needle-like crystals while the temperature of the suspension passes through the said transition point, and withdrawing said broken crystals before substantial regrowth of needle-like crystals.

5. The process of preparation of dense granular ammonium nitrate which includes cooling from about 70° C. to a temperature between the transition point temperature of about 32.1° C. and a lower temperature of about 13° C., a suspension of needle-like ammonium nitrate crystals in a saturated aqueous ammonium nitrate mother liquor, subjecting the suspension to sufficiently vigorous agitation to cause fragmentation of the needle-like crystals while the temperature of the suspension passes through the said transition point, and withdrawing said broken crystals before substantial regrowth of needle-like crystals.

ROBERT W. CAIRNS.